United States Patent [19]
Childs et al.

[11] 3,759,652
[45] Sept. 18, 1973

[54] MOLDING APPARATUS FOR MAKING THERMOFORMED ARTICLES
[75] Inventors: Edmund Childs, Long Meadow, Mass.; Raymond Ostrowski, Florence, S.C.
[73] Assignee: The KLM Company, Stratford, Conn.
[22] Filed: Apr. 5, 1971
[21] Appl. No.: 131,480

Related U.S. Application Data
[62] Division of Ser. No. 826,973, May 22, 1969, Pat. No. 3,606,063.

[52] U.S. Cl............................ 425/388, 425/DIG. 30
[51] Int. Cl............................................. B29c 17/04
[58] Field of Search................... 425/330, 344, 383, 425/388, 402, DIG. 30

[56] References Cited
UNITED STATES PATENTS
3,160,920  12/1964  Busch ............................... 425/388
3,585,688  6/1971  Richie ............................... 425/388

*Primary Examiner*—Robert L. Spicer, Jr.
*Attorney*—Darby & Darby

[57] ABSTRACT

A thermoformed screw type closure of semi-rigid material having a plurality of projections located between the uppermost point of the thread and the top of the closure which is recessed to lie inwardly of the root of the thread to engage the neck of a container onto which the closure is to be applied. The projections deform upon screwing down of the closure onto the container producing a good seal and fit and preventing the closure from backing off. A die is also disclosed for making closures of the foregoing type which utilizes the recessed portions of the closure as an aid in removing the closure from the die.

6 Claims, 3 Drawing Figures

PATENTED SEP 18 1973 3,759,652

MOLDING APPARATUS FOR MAKING THERMOFORMED ARTICLES

RELATED U.S. APPLICATION

This application is a division of U.S. Pat. application Ser. No. 826,973, filed May 22, 1969, now U.S. Pat. 3,606,063, which is assigned to the same assignee.

RELATED U.S. APPLICATION

In the copending U.S. Pat. application of Norman T. Exton, Ser. No. 599,433, filed Dec. 6, 1966, which is assigned to the same assignee, a closure is disclosed which is made by vacuum or pressure forming, which can generically be called thermoforming. The closure of that application is formed of a sheet of plastic material of relatively uniform cross-section which is drawn into or over a forming mold. In a specific embodiment of the invention, a thermoformed screw-type closure is described and claimed. Also disclosed and claimed are several specific forms of closures with integrally formed sealing rings which engage and seal the lip of a bottle.

The present invention relates to improvements in closures of the same general type, made by vacuum or pressure forming (hereafter called thermoforming) as disclosed in the aforesaid application and also to improvements in the machinery for the manufacture thereof. More specifically, in accordance with the subject invention, a sheet of plastic material of substantially uniform cross-section is thermoformed into a closure having a top or top wall and a downwardly depending skirt wall, the skirt wall being formed with a portion which is indented or stepped in from the remainder of the skirt wall. The step portion has a number of inwardly extending projections which engage the neck of the container onto which the closure is fastened.

In a preferred form of the invention, the closure is of the screw-type and is made of a semi-rigid plastic material whose skirt wall can flex, or bend, as well as the other portions of the closure. The stepped portion is located between the upper end of the thread and the closure top. The stepped portion is knurled to form a number of indented projections which extend into the central portion of the closure to a point beyond the root of the thread for a distance sufficient to engage the neck of the container which the closure is to seal. The projections of the knurled section by engaging the container neck deform and are compressed against the container neck making a tighter hold between the closure and the container. This is particularly important where two materials which are relatively slippery with respect to each other are used, such as plastic-to-glass or plastic-to-plastic, and particularly in respect to the subject invention where the skirt wall of the closure is relatively thin and can bend.

In accordance with another aspect of the invention, a novel mold is disclosed for making the closures of the subject invention. The mold is made of several pieces which permits a rapid and ready interchange of parts to produce closures having varying dimensions. The use of the stepped portion of the closure permits the closure to be more easily removed from the mold than if the portion of the closure above the end of its thread has a diameter substantially equal to or greater than the crest of the thread.

It is therefore an object of the present invention to provide a novel thermoformed closure having a number of projections for engaging the neck of the container which is to be sealed.

Another object is to provide a closure made of a deformable plastic material formed with an indented, or stepped, portion adjacent its upper end to engage the neck of the closure thereby to provide a friction fit which permits torquing down of the closure onto the container with a greater force.

An additional object is to provide a thermoformed closure of semi-rigid material having a number of projections for engaging the container, the projections being deformed as the closure is fastened to the container to provide a holding fit between the two.

Another object is to provide a mold for making thermoformed closures, the mold having a stepped portion adjacent the closure top which facilitates in the removal of a finished closure from the mold.

Other objects and advantages of the present invention will become more apparent upon reference to the following specification and annexed drawings, in which.

Figure 1:
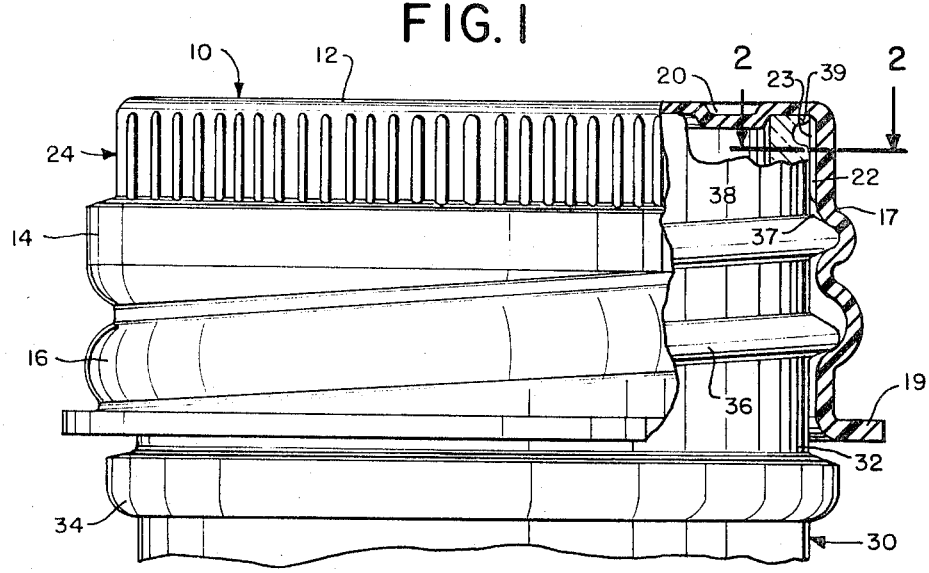
FIG. 1 is an elevational view shown partly broken away and partly in cross-section of a closure in accordance with the present invention fastened down onto a bottle.

Referring to FIG. 1, there is seen the closure 10 of the subject invention which is fastened down onto the neck 32 of a container shown as a bottle 30. The bottle 30 is of conventional construction and has a circumferential transfer ring 34 therearound which is used during manufacture and which also limits the downward travel of any closure which is placed onto the bottle. Located above the ring 34 in the neck area 32 is a thread 36, shown as being of the continuous type, the thread terminating at its upper limit at a point 37 which is below the sealing lip 39 of the bottle. An unthreaded circumferential area 38 exists between the upper limit 37 of the thread and the sealing lip 39. The sealing lip 39 is a circumferential lip on the top of the neck 32 on which the top of the closure rests and makes a seal with the bottle.

Figure 2:
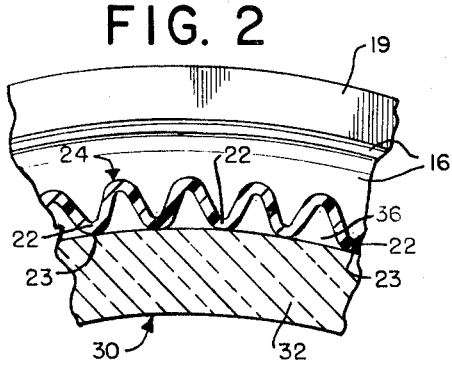
FIG. 2 is a fragmentary top view of the closure and bottle of FIG. 1 in cross-section along lines 2—2 of FIG. 1.

Considering now the closure, as shown in FIGS. 1 and 2, the closure is made of a plastic material having a substantially uniform thickness. As distinguished from conventional closures, which are formed by injection molding, the closure of the subject invention is made by a thermoforming technique. As explained above, the thermoforming technique can be either pressure or vacuum forming in which a sheet of material is placed adjacent the mold and then the sheet is either sucked, or forced into the mold, or in combination sucked and forced into the mold, or drawn over the mold to achieve the desired shape. The use of thermoforming permits closures to be made in a simple and economical manner since sheet plastic material can be utilized and, in general, the molds and machinery for using this process are considerably cheaper than the molds and machinery for conventional and comparable injection molding processes.

The material for the closure 10 can be any conventional plastic material which can be thermoformed. Suitable materials are polyethylene, polypropylene, polystyrene, copolymers, blends, compounds plain and filled of thermoformable plastics, etc. One material which has been found to be advantageous is ABS (acrylonitrile-butadiene-styrene). The range of preferred thicknesses for the sheet material used to form the closure is between about 0.010 inch to about 0.045 inch for closures which have a skirt wall in the order of ⅜ to ½ inch high. For closures with higher skirt walls, in the order of five-eighths to three-fourths inch, material somewhat thicker than 0.045 is preferably used. The exact thickness depends upon the material used, the type of container to be sealed and other factors. In general, it has been found that closures made of sheet material of a thickness in excess of 0.045 inch require more material and more time per cycle to be formed than closures made of thinner sheet material. In any event, the material thickness is selected so that the closure is a semi-rigid as distinguished from a rigid structure in which the portions thereof will bend or deform during application of the closure to the container with normal torquing force.

The closure 10 is formed with a top 12 from which depends downwardly a generally cylindrical skirt wall 14. A screw thread 16 is formed in the skirt wall whose shape, pitch and height corresponds to the screw thread 36 on the bottle. The screw thread 16 terminates at an upper point 17 which is below the top 12 of the cap, this point 17 generally corresponding to the upper limit 37 of the thread on the bottle. The bottom of the skirt wall terminates in an outwardly extending flange or bead 19 which can have any desired shape or outer diameter. The shape and size of the flange or bead can be controlled by the molding die. The size of the flange or bead also can be controlled by a cutting die which cuts the closure as it is on the forming mold or after it has been removed from the forming mold.

Also formed in the top wall 12 is an annular ring depression 20. The ring 20 has its outer diameter at a point which lies substantially adjacent the inner edge of the lip 39 of the bottle. As will be described below, the purpose of the annular depression 20 is to provide an additional sealing area between the closure and the bottle.

The area 24 of the closure skirt wall between the upper point of the thread 17 and the top 12 is stepped or indented with respect to the closure thread 16. As seen in FIGS. 1 and 2, a number of inwardly extending projections 22 are formed in the closure area 24. These projections are formed as part of a knurl and lie around the circumference of the closure. The projections 22 are of such a size so that their innermost points 23 will engage the neck of the bottle in the clear neck area 38. To state it another way, the distance, or diameter, between the inner points 23 of two diametrically opposed projections 22 is less than the outer diameter of the bottle neck in the area 38. This diametrical distance between two opposing projections 22 is also less than the diametrical distance of the root of the closure thread 16. In general, it has been found that the diametrical distance between projections 22 should be in the order of 5 to 20 percent less than the outer diameter of the bottle in the neck area 38. The exact difference between the two varies in accordance with tolerance changes in the glass of the bottle. However, the optimum difference is selected primarily on the basis of how much torquing force is to be applied to tighten the closure onto the bottle to provide an adequate seal.

It should be noted that the knurled area 24 of the closure of the subject invention does not correspond to the knurl which is present on metal closures. On metal closures, the inner projections of the knurl are not designed to engage the neck of the bottle. It is used primarily to provide a gripping surface for unscrewing the closure.

The operation of the closure of the subject invention is described below. The closure is screwed down onto the thread 36 of the bottle in the conventional manner with the bottom of the thread 16 first engaging and mating with the top point 37 of the bottle thread. As the closure is turned in the proper direction to tighten, or torque, it down onto the bottle, the closure moves down onto the bottle until a point is reached where the projections 22 on the top section of the closure start to engage the area 33 of the bottle lip before the closure has been fully screwed down. As the tightening action continues and as the closure moves further down onto the bottle, a frictional contact action takes place between the inner surfaces 23 of the projections 22 and the area 38 of the bottle neck. Since the material forming the closure is compressible and resilient, the projections 22 are slightly deformed and compressed outwardly as the screwing-down action continues giving some resistance to the torquing action. The amount of deformation is determined by the difference in the diametrical distance between projections 22 and the outer diameter of the neck area 38. This action continues until the closure is fully seated onto the bottle neck with the top of the closure thread 17 located at the upper extremity 37 of the bottle thread and the top 12 of the closure seated on the neck sealing lip 39.

The projections 22 can have different shapes to suit a variety of conditions. For example, for more resilient materials such as high density polyethelene and polypropylene, a triangular cross-section projection 22 provides somewhat more resistance to torquing than a semi-circular cross-section. For more rigid materials, for example such as polystyrene and ABS, a semi-circular or semi-elliptical cross-section for the projections 22 would make them somewhat more resilient, and thereby give more resistance to torquing, than using a triangular cross-section.

As should be apparent, due to the inner surfaces 23 of the projections 22 contacting the area 38 of the bottle neck as the closure is being screwed down onto the bottle, the tightening action of the closure will require somewhat more force to tighten it down onto the bottle than if these projections 22 were not provided. However, the amount of extra force required is not unduly large. Once the seat is made the closure will have greater holding power than if the projections were not present since the projections 22 are compressed and prevent the closure from backing off. This is particularly advantageous in closures of the type contemplated by the subject invention where the sheet plastic materials are somewhat more "slippery" in nature than the end result of an injection molded closure. Since the skirt wall of the closure 10 is not rigid, it can deform due to irregularities in size or shape of the bottle thread resulting in an improper seat of the closure. These effects are compensated for by the projections 22 which have a holding force of their own irrespective of the thread configuration of the bottle. This is particularly true when the closure is used with containers of plastic material whose necks are also not rigid.

The use of the projections 22 also provides a tighter seal for the outside diameter of the bottle neck which permits the top 12 of the closure to be brought down more and held more firmly onto the lip 39 of the bottle.

Use of the projections 22 also prevents "doming" of the closure. Since the closure is not a rigid structure, excess force used in screwing down the closure onto the container or screwing it down too far will cause the top 12 of the closure to bow outwardly from the bottle sealing lip 39 into a generally convex shape. This bowing is called "doming." Of course, in rigid cap structures, this doming does not occur.

The presence of the knurled indented section 24, with its inward projections 22, alleviates or eliminates doming. The knurled section 24 provides a sufficiently tight fit between the closure and the bottle so that the user does not have to torque down the closure onto the bottle, before a tight fit between the two is obtained, by a distance which would cause the doming to occur. Also, the projections 22, since they deform outwardly, give some expansion area for the upper portion of the closure as it is fully torqued down onto the bottle.

Considering now the depressed ring 20 on the top 12 of the closure, as should be apparent, when the closure is fully tightened onto the bottle neck the inner edge of the lip 39 engages the sealing ring 20. Due to the fact that the material of the closure is resilient, the ring 20 will be crushed or deformed slightly thereby providing an additional sealing area at the inner edge of the bottle lip. If the inner diameter of the bottle lip 39 is smaller than what is shown in FIG. 1, then the inner edge of the lip 39 will engage the sealing ring 20 more towards the center of the closure. This will still provide sealing in view of the deformable nature of the material forming the ring 20.

Figure 3:
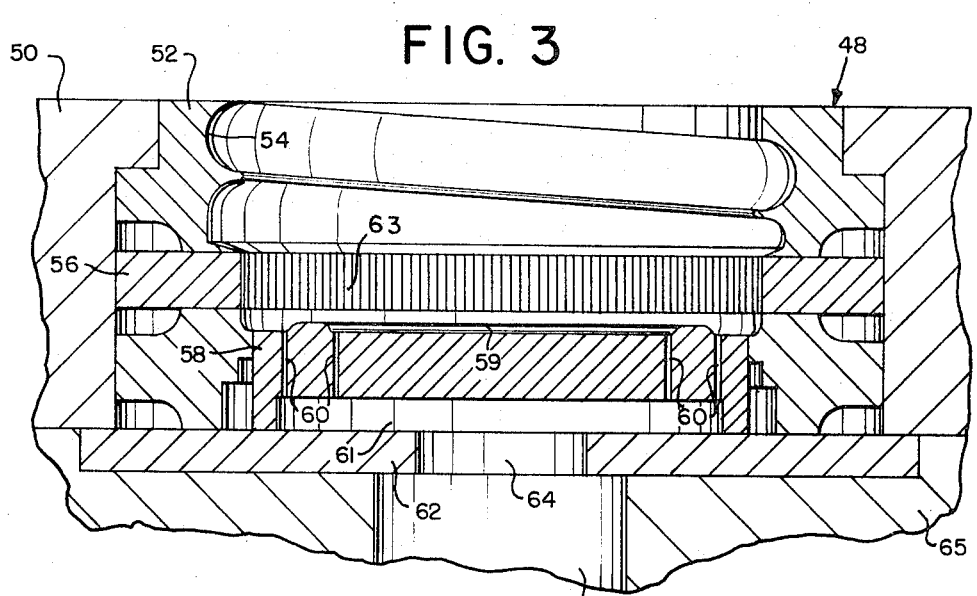
FIG. 3 is an elevational view in cross-section showing a novel mold for making the closure of the subject invention.

The stepped, knurled area 24 of the closure 10 provides an additional manufacturing advantage which will become more apparent upon consideration of FIG. 3. Here, a die 48 is shown for making the closure 10 of FIGS. 1 and 2. The die 48 is formed of separate pieces which are held within a socket 50.

A thread ring piece 52 forms the top element of the die. Piece 52 has an interior wall on which is formed a thread 54 for making the portion of closure skirt wall 14 containing the thread 16. Located below the thread ring piece 52 is a knurl ring piece 56. The knurl ring piece 56 has an interior wall on which is formed a knurl 63 corresponding to the knurled area 24 of the closure of FIG. 1. The die 48 is completed by a disc piece 58 whose upper surface corresponds to the top 12 of the closure. The depressed ring 20 of the closure is formed by the raised ring 59 of the upper surface of disc piece 58. The three pieces 52, 56, 58 when assembled together form a cavity corresponding to the shape of the closure.

As seen, the disc piece 58 has a number of passages 60 therethrough. One end of each passage communicates with a recessed area 61 in the back of the top disc 58. The other end of each passage communicates with the die cavity, that is, the interior portions of the thread ring piece 52 and the knurl ring piece 56.

The die 48 and the socket 50 rest on a plate 62 which has a central passage 64 therein in communication with the disc recessed area 61. The plate 62 in turn rests on a block 65 which would be located in the molding machine. The block 65 also has a passage 66 which communicates with the passage 64 in the plate 62.

In making the closure, a sheet of plastic material is laid on top of socket 50. A reduced pressure is supplied to the passage 66 and, at the same time, the die and/or the sheet material is heated. The reduced pressure applied through passages 66, 64, 61 and 60 draws the plastic material into the cavity formed by the three pieces 52, 56 and 58 of the die so that the closure is formed. After the closure is formed, another cutting die (not shown) comes down to cut the closure around its edges on the flat top portion of either piece 52 or socket 50 to form the flange 19. As should be apparent, the forming operation is carried out simultaneously with a number of dies so that a number of closures are made at the same time.

The mold 48 formed of the three pieces permits rapid changes in the dimensions of the closures being manufactured. For example, if only the thread shape is to be changed between two closures, it is only necessary to change the thread ring 52 instead of making an entirely new die with a different thread. The same holds true with respect to the knurl ring 56 if the diameters of the projections 22 have to be changed for a different bottle neck size. As should be apparent, this is a considerably more economical arrangement than providing separate dies for each change of only one, or several, of the major dimensions of the closure.

After a closure is formed in a die 48 it must be removed. This can be accomplished in a number of ways. It is possible to blow out the closure by applying pressure through the conduit 66. This technique can work with the closure of the subject application since the closure is not a rigid structure and it is possible for the walls thereof to deform. However, this technique has in general been found to be not entirely satisfactory. A more positive arrangement for removing the closure from the die is to either strip it out or unscrew it out. Since the closure is a resilient structure, it is possible to pull it directly out of the die without unscrewing it. As an alternative to this, a force can be applied to the top of the closure as it lies in the die to push it out of the die. It should be apparent that were it not for the recessed section 24 on the closure that such an operation would be difficult, if not impossible, since if the section 24 of the closure were as wide, if not wider than the crests of the threaded area 56 in the die, the closure would experience difficulty in clearing the die thread 56.

A closure can also be unscrewed from the die. Here, again, the recessed area 24 becomes important since if the area 24 has the same diameter as between the roots of the thread 16, the closure could not be unscrewed from the die.

The closures of the present invention can be manufactured by either suction or pressure forming techniques or a combination of suction and pressure forming techniques from a sheet of material. In a pressure forming technique, a female cavity mold is used and the sheet material is softened, such as by heating it. Pressure is then applied to the upper surface of the sheet to force it down into the mold cavity where the closures are formed. The individual closures are then cut, preferably by a die, where a multi-cavity mold is used. A combination of suction and pressure forming also can be used where pressure is applied to the upper surface of the material sheet and suction applied through the die to suck the material in.

In any of the forming techniques described above, "assist" members also can be used to and in producing the closures. The assist members take the shape of a plug for each cavity which is of somewhat smaller diameter than the diameter of the cavity. The plug is pressed down on the upper surface of the sheet and forces the softened material down into the cavity. This is especially useful in the manufacture of closures with high skirt walls.

As should be apparent, a novel thermoformed closure has been described which is simple to manufacture and has advantages with respect to cost and effectiveness.

What is claimed is:

1. Apparatus for forming from thermoplastic sheet material closures having a top wall and a skirt wall depending from said top wall comprising a die formed of a plurality of pieces and including a first piece having a generally circular first wall lying generally transverse to the die longitudinal axis and corresponding to the closure top wall and a second piece having an internal wall of a first predetermined maximum diameter lying generally parallel to the die longitudinal axis and corresponding to the closure skirt wall, said first wall of said first piece and said internal wall of said second piece defining a cavity, said die cavity formed with another internal wall at the juncture of the said first wall of said first piece and said internal wall of said second piece which other wall lies generally parallel to the die longitudinal axis and has a maximum diameter less than said first predetermined diameter to produce a stepped-in portion on the closure skirt wall adjacent its top wall.

2. Apparatus as in claim 1 further comprising a third piece for said die located between said first and second pieces on which said other interal wall of the cavity is formed.

3. The combination of claim 1 wherein the internal wall of said second piece is shaped to have a thread thereon to form a thread on the closure skirt wall.

4. The combination of claim 2 wherein said third piece is shaped to have projections thereon to form inwardly extending projections on the closure skirt wall.

5. Apparatus in claim 1 wherein said second piece is formed with a flat wall portion outside of the cavity lying generally parallel to the wall of the first piece on which a flange is formed for the closure at the lower end of its skirt wall.

6. Apparatus as in claim 2 wherein said second piece is formed with a flat wall portion outside of the cavity lying generally parallel to the wall of the first piece on which a flange is formed for the closure at the lower end of its skirt wall.

* * * * *